United States Patent
Namburu et al.

(10) Patent No.: US 10,322,466 B2
(45) Date of Patent: Jun. 18, 2019

(54) ENHANCED PIERCING AND OPERATION OF PLASMA CUTTING TORCH AND SYSTEM

(71) Applicant: LINCOLN GLOBAL, INC., City of Industry, CA (US)

(72) Inventors: Praveen K Namburu, Mount Pleasant, SC (US); William T Matthews, Chesterland, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 136 days.

(21) Appl. No.: 15/440,164

(22) Filed: Feb. 23, 2017

(65) Prior Publication Data

US 2018/0236588 A1    Aug. 23, 2018

(51) Int. Cl.
*B23K 9/00* (2006.01)
*B23K 9/02* (2006.01)
*B23K 10/00* (2006.01)
*H05H 1/34* (2006.01)
*H05H 1/36* (2006.01)

(52) U.S. Cl.
CPC ............ *B23K 10/006* (2013.01); *B23K 10/00* (2013.01); *H05H 1/34* (2013.01); *H05H 1/36* (2013.01); *H05H 2001/3457* (2013.01); *H05H 2001/3494* (2013.01)

(58) Field of Classification Search
CPC . B23K 9/00; B23K 9/013; B23K 9/06; B23K 9/067; B23K 9/073; B23K 9/10; B23K 9/1006; B23K 10/00; B23K 10/006

USPC .............. 219/121.11, 121.16–121.18, 219/121.36–121.44, 121.48

See application file for complete search history.

(56) References Cited

U.S. PATENT DOCUMENTS

| 5,036,176 | A  | * | 7/1991  | Yamaguchi | B23K 9/06 219/121.44 |
| 5,548,097 | A  | * | 8/1996  | Couch, Jr. | H05H 1/36 219/121.44 |
| 5,844,197 | A  |   | 12/1998 | Daniel | |
| 6,914,209 | B2 | * | 7/2005  | Yamaguchi | B23K 10/006 219/121.39 |
| 2003/0204283 | A1 | * | 10/2003 | Picard | B23K 10/00 700/166 |
| 2010/0018954 | A1 |   | 1/2010  | Hussary et al. | |

FOREIGN PATENT DOCUMENTS

| EP | 2 939 782 A1 | 11/2015 |
| WO | 92/18282 A1 | 10/1992 |
| WO | 2015/071737 A1 | 5/2015 |

OTHER PUBLICATIONS

Extended European Search Report from Corresponding European Application No. 18158366.7; dated Jun. 8, 2018.

* cited by examiner

Primary Examiner — Sang Y Paik

(57) ABSTRACT

Embodiments of the present invention include a plasma cutting system having a plasma cutting power supply. The plasma cutting power supply outputs a pierce current which is higher than a maximum operational current rating for a torch for the cutting operation for a determined duration. After the expiration of the duration the output current is reduced to a cutting current level. Embodiments allow for the cutting of thicker materials than known systems.

20 Claims, 5 Drawing Sheets

ENHANCED PIERCING AND OPERATION OF PLASMA CUTTING TORCH AND SYSTEM

TECHNICAL FIELD

Devices, systems, and methods consistent with the invention relate to cutting, and more specifically to devices, systems and methods related to plasma arc cutting torches and components thereof.

BACKGROUND

In many cutting, spraying and welding operations, plasma arc torches are utilized. With these torches a plasma gas jet is emitted into the ambient atmosphere at a high temperature. The jets are emitted from a nozzle and as they leave the nozzle the jets are highly under-expanded and very focused. However, because of the high current loads and temperatures associated with the ionized plasma jet many of the components of the torch are susceptible to failure. This failure can significantly interfere with the operation of the torch and prevent proper arc ignition at the start of a cutting operation. Because of this tendency many cutting operations are limited, for example in the thickness of the material that they can cut. This thickness limitation is often dictated by the maximum piercing capability of the torch at the maximum amperage rating. For example, an 80 amp rated torch can only cut a mild steel having a thickness of ¾ of inch or less, because that is the maximum thickness that can be effectively pierced at the 80 amp rating. Thus, these limitations require higher capability torches (e.g., higher current load) to cut thicker materials. This can be disadvantageous as a user may need to have many different torches or have to buy more expensive torches to cut thicknesses only slightly thicker than the maximum rated thicknesses for the current inventory of torches.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is plasma cutting system and components thereof that are designed to pierce thicker materials than normally permitted. This is accomplished by utilizing a higher pierce current load than the maximum operation current load for the torch, for a limited amount of time.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to plasma arc torches useful various cutting, welding and spraying operations. Specifically, embodiments of the present invention are directed to air cooled plasma arc torches, while others are directed to liquid cooled embodiments. Of course, some of the features described herein can be used in either torch configurations without detracting from the novelty of the exemplary embodiments. Further exemplary embodiments are directed to air cooled plasma arc torches which are retract arc torches. As generally understood, retract arc torches are torches where the electrode is in contact with the nozzle for arc initiation and then the electrode is retracted from the nozzle so that the arc is then directed through a throat of the nozzle. In other types of retract torches, the electrode stays stationary and the nozzle is moved. Exemplary embodiments of the present invention can apply to both types. The construction and operation of these torches, as well as liquid cooled torches, are generally known, and thus their detailed construction and operation will not be discussed herein. Further, embodiments of the present invention can be used in either handheld or mechanized plasma cutting operations. It should be noted that for purposes of brevity of clarity, the following discussion will be directed to exemplary embodiments of the present invention which are primarily directed to a hand held plasma torch for cutting. However, embodiments of the present invention are not limited in this regard and embodiments of the present invention can be used in welding and spraying torches without departing from the spirit or scope of the present invention. Various types and sizes of torches are possible at varying power levels if desired. Further, the torches and components described herein could be used for marking, cutting or metal removal. Additionally, exemplary embodiments of the present invention, can be used with varying currents and varying power levels. The construction and utilization of air coolant systems of the type that can be used with embodiments of the present invention are known and need not be discussed in detail herein.

Figure 1:
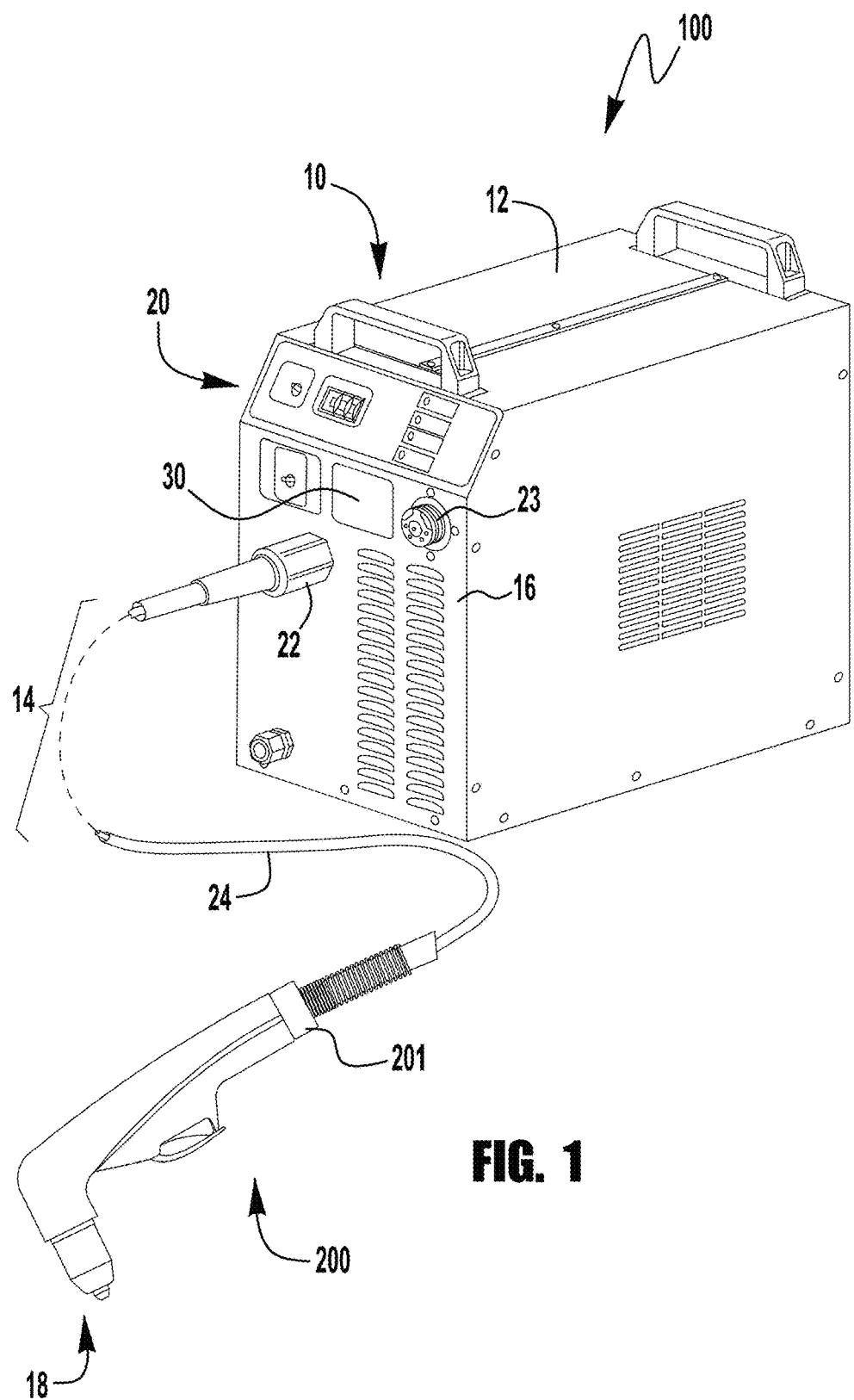
FIG. 1 is a diagrammatical representation of an exemplary cutting system which can be used with embodiments of the present invention.

Turning now to FIG. 1, an exemplary cutting system 100 is shown. The system 100 contains a power supply 10 which includes a housing 12 with a connected torch assembly 14. Housing 12 includes the various conventional components for controlling a plasma arc torch, such as a power supply, a plasma starting circuit, air regulators, fuses, transistors, input and output electrical and gas connectors, controllers and circuit boards, etc. Further, the power supply 10 can include a computer controller such as a CPU, etc. memory, etc. to control the operation of the power supply as desired. Such controllers and control configurations are known and need not be described in detail herein. Torch assembly 14 is attached to a front side 16 of housing. Torch assembly 14 includes within it electrical connectors to connect an electrode and a nozzle within the torch end 18 to electrical connectors within housing 12. Separate electrical pathways may be provided for a pilot arc and a working arc, with switching elements provided within housing 12. A gas conduit is also present within torch assembly to transfer the gas that becomes the plasma arc to the torch tip, as will be discussed later. Various user input devices 20 such as buttons, switches and/or dials may be provided on housing 12, along with various electrical and gas connectors.

The power supply also includes a user interface/display which can be of the LCD touch type display 30, which allows for user inputs. The display can visually display input selections, power supply status, operational settings, etc. The display/UI 30 is coupled to the internal computer/controller of the power supply 10 so as to allow for user entries to be provided to the controller and display information intended to be displayed by the controller.

It should be understood that the housing 12 illustrated in FIG. 1 is but a single example of a plasma arc torch device that could employ aspects of the inventive the concepts disclosed herein. Accordingly, the general disclosure and description above should not be considered limiting in any way as to the types or sizes of plasma arc torch devices that could employ the disclosed torch elements.

As shown in FIG. 1, torch assembly 14 includes a connector 22 at one end for attaching to a mating connector 23 of housing 12. When connected in such way, the various electrical and gas passageways through the hose portion 24 of torch assembly 14 are connected so as to place the relevant portions of torch 200 in connection with the relevant portions within housing 12. The torch 200 shown in FIG. 1 has a connector 201 and is of the handheld type, but as explained above the torch 200 can be of the mechanized type. The general construction of the torch 200, such as the handle, trigger, etc. can be similar to that of known torch constructions, and need not be described in detail herein. However, within the torch end 18 are the components of the torch 200 that facilitate the generation and maintenance of the arc for cutting purposes, and some of these components will be discussed in more detail below. Specifically, the some of the components discussed below, include the torch electrode, nozzle, shield and swirl ring.

As described briefly above, plasma cutting torches have amperage ratings (e.g., 80 amps, 100 amps, etc.) which tend to indicate the maximum operational amperage of the torch and its internal components. Exceeding this amperage rating tends to accelerate the failure of the torch and components therein. Because of these amperage ratings and limitations known torches and cutting systems are limited in the thicknesses of materials that they can cut. This limitation is primarily due to the piercing limitations. That is, for each maximum current rating for a respective torch there is a maximum material pierce thickness. For example, most 80 amp torches can only pierce a mild steel work piece having a thickness of ¾ inch or less. This is the maximum thickness of material that they can pierce at the maximum current of 80 amps. These limitations are typically due to thermal capacity limitations on the torch components, such as the electrode, nozzle, etc. That is, if the cutting operation is operating at a current level higher than that of the rated current level the heat in the torch components can cause their premature failure.

Figure 2C:
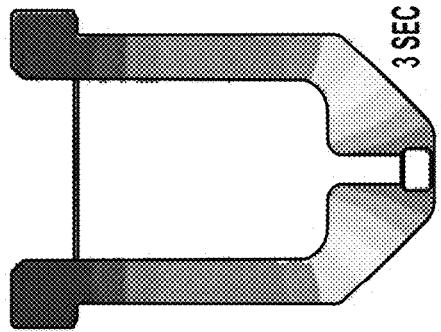
FIGS. 2A through 2F are diagrammatical representations of thermal gradients on an exemplary nozzle at different stages during a pierce operation.
Figure 2F:
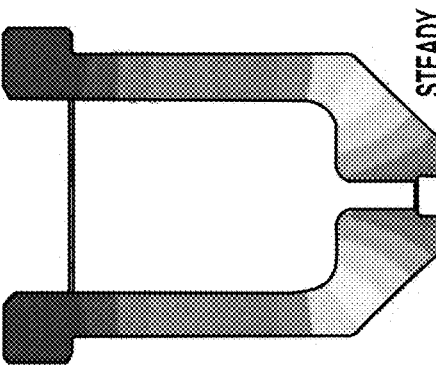
Figure 2B:
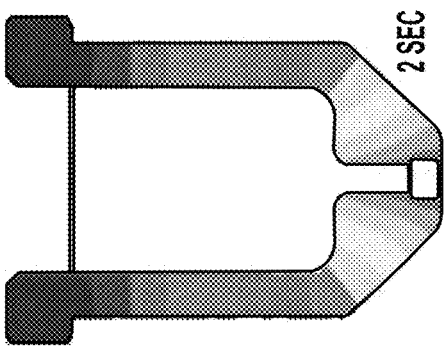
Figure 2E:
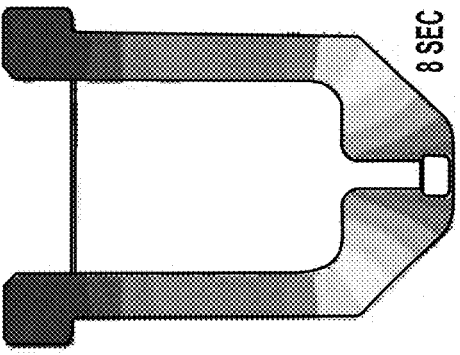
Figure 2A:
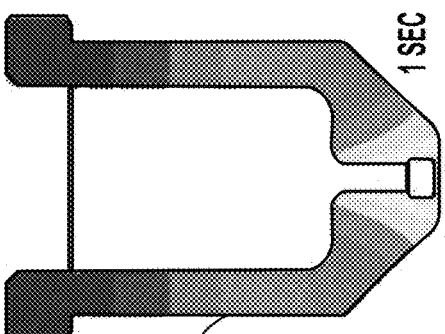
Figure 2D:
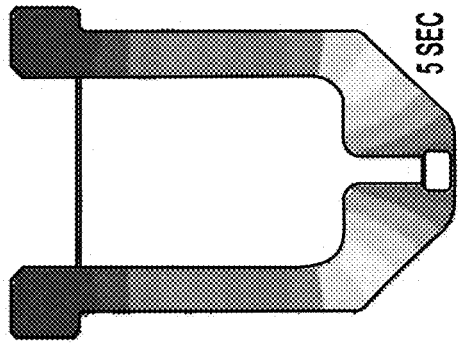

However, because of the thermal characteristics of the torch and its internal components, the steady state operational temperature of a torch is not reached immediately as the cutting operation begins. That is, it typically takes some time (a number of seconds) for torch components to reach there operational steady state temperatures, at which the torch and components can operate. This is generally shown in FIGS. 2A through 2F. Each of these figures depicts an exemplary torch nozzle 210 through which the plasma arc passes to the workpiece. (Because the construction and operation of plasma torches and components are known, they will not be discussed in detail herein.) FIG. 2A depicts an exemplary nozzle 210 and its temperature gradients after about 1 second of operation. FIG. 2B depicts the same nozzle at about 2 seconds. FIG. 2C shows the same nozzle at about 3 seconds. FIG. 2D shows the same nozzle at about 5 seconds and FIG. 2E shows the same nozzle at about 8 seconds. Finally, FIG. 2F shows the nozzle 210 at its steady state, which can occur shortly after 8 seconds. As shown, the steady state temperature gradients in the nozzle occur after a period of time after ignition of the arc. Exemplary embodiments of the present invention take advantage of these thermal properties to achieve enhanced piercing and cutting thicknesses over known systems.

Specifically, in exemplary embodiments of the present invention, the piercing current is set at a current level which is higher than that of the steady state current rating of the torch and its components. This higher current level is used for a brief amount of time to allow piercing into thicker material and then after pierce the current level is dropped to a steady state level for a cutting operation. This is explained further below.

Exemplary embodiments utilize a pierce current that is higher than the steady state current level for a given torch to pierce a larger thickness that would otherwise be capable. That is a pierce current is maintained for a duration of time or until pierce is detected and then the current is dropped to a steady state current level that is consistent with the current ratings for the torch and its components. This allows for cutting thicker materials with torches that traditional had appreciable thickness limitations. This is further explained with the following discussed figures.

Figure 3:
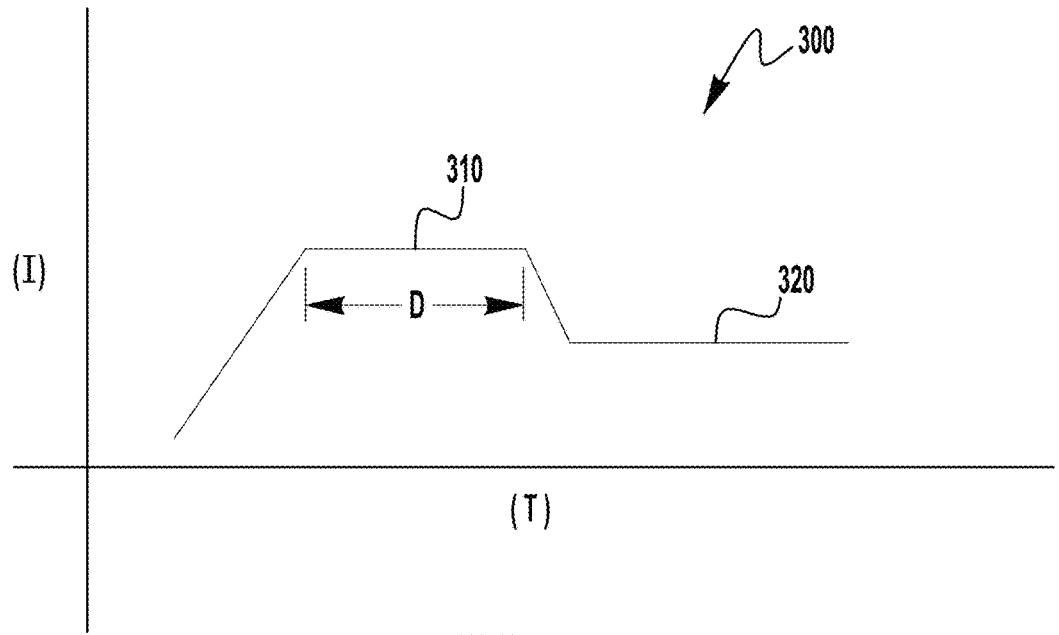
FIG. 3 is a diagrammatical representation of an exemplary pierce current waveform.

FIG. 3 depicts an exemplary plasma cutting current profile 300 of embodiments of the present invention. As shown, the current profile has a pierce portion 310 and a steady state cutting portion. As shown the pierce portion 310 has a higher current level than the steady state current level. The pierce current is maintained for a duration D that is sufficient to allow a work piece to be pierced, but is not too long so as to cause the torch components, such as the nozzle, to exceed their thermal capacities, which can accelerate their failure. This increased current during pierce causes the components, such as the nozzle, to reach its desired steady state thermal gradient condition quicker than which a normal pierce operation, but because the duration D is relatively short the thermal capacity is not exceeded, or only briefly exceeded, thus preventing damage to the components. This increased pierce current allows the torch to pierce, and then cut a thicker work piece than would otherwise be able to be pierced using a typical current profile.

That is, while the heat generation during pierce will be higher than the heat generation that may be experienced during normal cutting, it will be over a short time and thus, the acceptable heat load on the components, such as the nozzle, electrode, etc. would not exceeded. This is because Heat Load (W)=Joule/Sec=(Mass*Specific Heat Capacity– CP*ΔTemp)/Time (e.g., sec.), and while the specific heat capacity may be higher, the length of time at that heat is reduced for a particular mass and temperature difference.

In an exemplary embodiments, the pierce current is in the range of 20 to 60% higher than that of the maximum steady state cutting current for the torch. In other exemplary embodiments, the pierce current 310 is in the range of 25 to 50% higher than that of the maximum steady state cutting current. For example, if a torch and its components have a maximum steady state cutting current 320 of 80 amps, the max. pierce current can be in the range of 100 to 125 amps. This will allow an 80 amp torch to be able to pierce and cut mild steel up to at least 1 inch thick, where prior torches are limited to ¾ inch thick workpieces. This represents a significant advantage over known torches and cutting systems, and can allow cutting systems to effectively pierce and cut workpieces which are over 25% thicker than what would have been able to be cut using traditional systems and methods.

Figure 4:
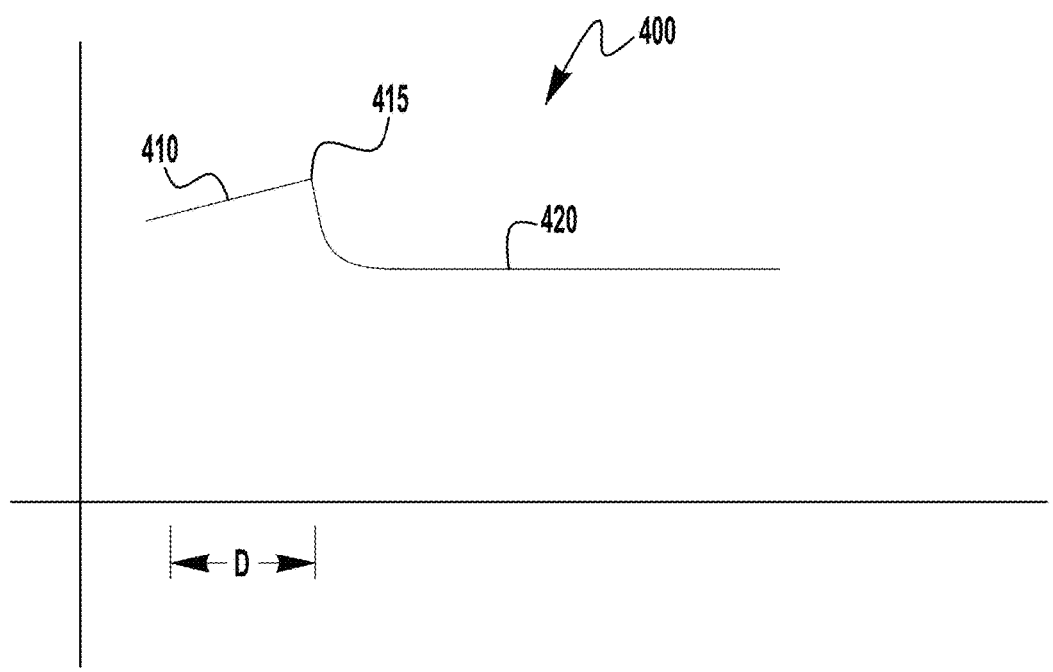
FIG. 4 is a diagrammatical representation of an exemplary pierce voltage waveform.

FIG. 4 depicts an exemplary voltage waveform during pierce and steady state cutting in accordance with embodiments of the present invention. As shown, the voltage has a ramp up portion 410 to a maximum pierce voltage 415. After pierce the voltage drops to a steady state voltage 420 which corresponds to the steady state cutting current. As shown, at the point 415 the plasma arc pierces the workpiece. It should also be understood that piercing is typically done at a higher torch height from the plate than cutting. In exemplary embodiments of the present invention, the pierce can be detected by detecting voltage and/or dv/dt. In exemplary embodiments, the power supply controller can use an internal timer/clock to detect the time from plasma start to pierce 415, to determine the amount of time D that the current level was at the higher pierce level.

In exemplary embodiments of the present invention, the pierce time D can be a predetermined or preset time D. For example, in one embodiment a user can enter a preset pierce time D after which the current will be dropped to the steady state cutting current level and a pierce current level (e.g. 110 amps). In such embodiments, the power supply will output the present current level for the preset time. However, in such embodiments, the controller of the power supply determines whether or not the preset current and time D exceeds the thermal capabilities of the torch and/or components (e.g., nozzle) and will not permit operation if the entered data exceeds the thermal capabilities of the components. For example, in such embodiments a user can input information related to the torch and/or its components, such as a torch type or part number. The controller of the power supply uses a look up table to determine the thermal capacity of the torch, for example using the thermal capacity of the nozzle within the torch. If the selected current level, selected duration or the combination of the selected current level and duration exceed the predetermined thermal limits of the torch/component then the operation will be locked out. Further, the system can use a display and/or user interface to display the lock out or warning to the user. For example, based on the selected torch/components the controller will determine/look up a maximum pierce current, which cannot be exceeded, and the controller can look up/determine a maximum pierce time at a selected current level. For example, at a selected pierce current of 100 amps, the controller can provided a maximum pierce time D of 3 seconds, while at a pierce current of 110 amps the maximum pierce time can be at 2.5 seconds. This would prevent a user from entering a pierce current/time combination that will exceed the thermal capabilities of the torch and/or its components. In exemplary embodiments, the pierce time can be in the range of 1 to 5 seconds, and in other exemplary embodiments, the pierce time can be in the range of 2 to 4 seconds.

In another exemplary embodiment, the controller of the power supply uses input information, such as torch type, or torch limitations and pierce current to determine a maximum pierce duration D. When the cutting operation is started, the controller starts a timer and either shuts off or reduces the output current at the first of (1) a detected pierce (e.g., 415) or (2) at the expiration of the predetermined duration D. This ensures that the thermal capacity of the torch/components are not exceeded. In some exemplary embodiments, if the determined duration D is reached without a pierce event being detected (for example detecting a voltage drop and/or a dv/dt change) the output current is stopped and/or a display on the power supply can provide either an audio or visual warning of the failure to pierce. In other exemplary embodiments, at the expiration of the period D the power supply can drop the output current to the maximum allowed steady state cutting current of the torch/components and continue with the cutting operation. In such embodiments, the power supply can output an audio and/or visual indication that a pierce may not have occurred.

In further exemplary embodiments, the power supply/ controller allows a user to enter information such as material type and material thickness. The controller of the power supply uses this information, coupled with information regarding the attached cutting torch, to determine whether or not a pierce is possible with the equipped torch. In such embodiments, for example, the controller takes into account the torch/torch component equipped in the torch, the material thickness and the material type and uses a look up table, or the like within the controller to determine the if the material can be pierced and cut without changing the torch. For example, the user can input the torch that is equipped. For example, the data entry whether by part number, serial number, or part type for either the torch assembly, or a specific component such as the nozzle. Alternatively, the user can enter the maximum steady state cutting current rating for the torch. The user can then also enter the material type (e.g., mild steel, stainless steel, etc.) and the material thickness (e.g., ¾ inch, 1 inch, etc.). With this information, the computer can use a look up table to determine if the torch/torch component can be used to properly pierce and cut the workpiece. With this information, the controller/ computer can determine the pierce current and the maximum duration of the pierce period.

The following is a description of an exemplary implementation. In such an example, the user connects a torch assembly to the power supply 10 and can then use the user interface 30, or other mechanism, to indicate the capacity of the torch connected. For example, the user can enter that the torch is an "80 amp" torch, which means that the torch is designed to have a maximum steady state cutting current of 80 amps. The user then enters the material type (e.g., mild steel) and the material thickness (e.g., 1 inch). Using the look up table within the controller of the power supply the controller determines that a successful pierce and cut can be achieved. After this determination the display 30 can display a green indicator (or something similar) to indicate that a pierce and cut can be achieved, and can set a pierce current and pierce duration D for the pierce operation. In another exemplary embodiment, the controller can simply use the torch/component information and the material type and display a maximum pierce thickness to the user via the display 30.

In either implementation, the controller determines the pierce current and the pierce duration D based on the input information. When the process begins the controller monitors the time at the pierce current and if pierce is detected prior to expiration of the period D then the controller lowers the output of the power supply 10 to the cutting current. If no pierce is detected then the controller can stop the operation or drop the current and continue with cutting, depending on the set up configuration.

The above determinations for pierce current and pierce duration D can take into account a number of factors. However, in some exemplary embodiments, the nozzle 210 of the torch can be used as the torch component that is determiner of the pierce current and/or pierce duration D. This is because the nozzle is often the torch component that is most sensitive to, or otherwise affected by, the heat generated by the plasma arc. In fact, because of the relationship Heat Load (W)=Joule/Sec=(Mass*Specific Heat Capacity-CP*ΔTemp)/Time (e.g., sec.), the mass of the nozzle 210 can be a driver to determine the maximum pierce current and maximum pierce duration. Thus, in some embodiments, when the user enters the torch information, the controller look up table can use mass information associated with the nozzle of that torch to make the determinations described above. Further, in some exemplary embodiments, the overall size of the nozzle can be a determining factor because larger nozzles have larger surface areas. That is, the time it takes for temperature to stabilize inside a body under a heat load can be represented by $T=(e*V*cp)/(h*As)$, where e is the density of the body ($kg/m^3$), V is the volume of the body ($m^3$), cp is the specific heat of the body (J/kg*K), h is the convection heat transfer coefficient of the fluid in which the body is in ($W/m^2*K$), and the As is the surface area of the body ($m^2$). Thus, in some embodiments, when the user enters the torch information the look up table can look up information about the nozzle for the above relationship (e.g., the surface area, volume, etc.) and the controller can determine a duration for temperature stabilization under a given heat load. In other embodiments, the user can enter shielding gas information including type and flow rate, which can be used to determine the duration to stabilization. It is noted that the above relationship can also be simplified to again utilize the mass of the nozzle, by using the relationship $T=(M*cp)/(h*As)$, where M is mass.

Figure 5B:
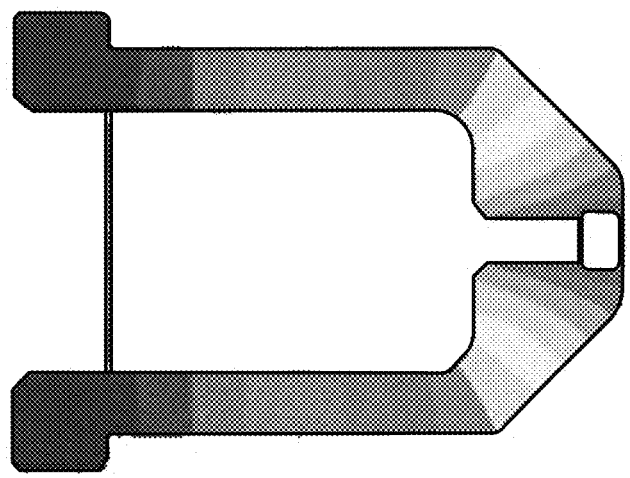
FIGS. 5A and 5B are diagrammatical representations of thermal gradients in an exemplary nozzle after a known pierce operation and a pierce operation consistent with an exemplary embodiment.
Figure 5A:
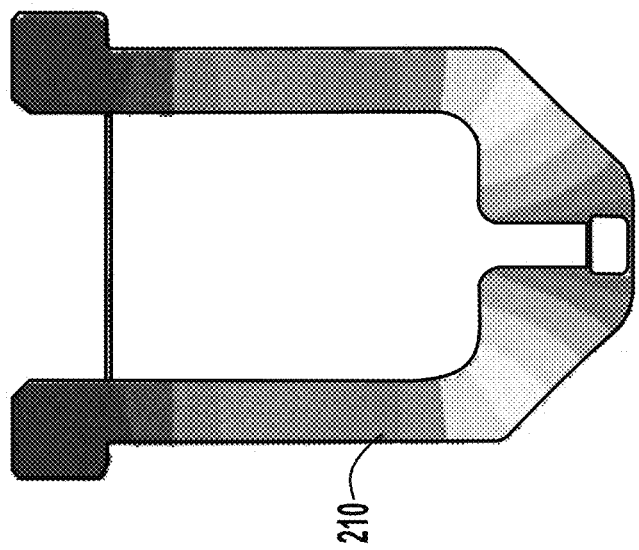

The thermal impact of the above discussions can be seen in FIGS. 5A and 5B. FIG. 5A depicts the temperature gradients of a nozzle 210 operating at a steady state cutting current of 80 amps (see also FIG. 2F). However, FIG. 5B depicts the temperature gradients in the same nozzle 210 at a pierce current of 100 amps after about 2 seconds. As can be seen the temperature gradients are very similar. Thus, this nozzle can pierce at 100 amps for about two seconds and achieve the same or similar temperature gradient as achieved at steady state cutting. Thus, if the workpiece is pierced after 2 seconds at 100 amps the current can return to 80 amps (in this example) and continue cutting with no adverse effects on the nozzle 210. So long as the pierce current and the duration D do not impart too much heat into the nozzle, embodiments of the present invention can allow for the pierce and subsequent cutting of workpieces with larger thicknesses then were previously possible, at the respective current ratings of known torches. Of course, in embodiments of the present invention the power supply 10 should be able to output the desired pierce and cutting currents needed. However, because the design, construction and operation of high current cutting power supplies are known, the details of those systems need not be described in detail herein.

Because the thermal integrity of the torch components (for example, the nozzle) can be adversely effected if they are overheated during operation, exemplary embodiments of the present invention can use various methodologies to prevent overheating the torch and/or its respective components. For example, in some exemplary embodiments the torch can include a thermal sensor which is coupled to the controller of the power supply. The sensor can be mounted on or in the torch to monitor the temperature of a torch component, such as the nozzle, to detect the component temperature. Using the sensed temperature the controller will lock out a piercing operation that requires the pierce current to exceed the maximum steady state cutting current of the torch. This prevents any subsequent piercing operation from damaging any part of the torch. For example, the controller will set a temperature threshold level under which a pierce current can be employed which exceeds the max. steady state current rating (see FIG. 3, for example). This ensures that the starting temperature of the torch/component is sufficiently cool such that the higher current will not cause damage. However, if the detected current is above the threshold level the controller will only allow a subsequent pierce current that is at or below the max. steady state current level. This is because the cooling system of the torch (for example liquid or air) will be able to sufficiently cool the torch/component through the piercing operation. In some exemplary embodiments, the controller can sense the torch/component temperature every time prior to initiating a pierce operation to ensure that a pierce can occur without damage. In other embodiments, the controller will only detect the torch/component temperature if the selected pierce current is above the max. steady state current level for a cutting operation. Thus, for example, if the max. steady state current level is 80 amps and the desired/selected pierce current is at or below 80 amps, then no temperature check will be done, but if the pierce current is to exceed this level, then a temperature check will be made. If the sensed temperature is too high, then the process will not be started until the detected temperature is below a desired starting temperature level. In some embodiments an indication (visual and/or audio) can be made in the power supply to indicate that the process will not start as the torch is too hot.

In other exemplary embodiments, the controller can use a cool down threshold value after each cutting operation to allow for sufficient cooling. For example, the controller of the power supply can have a determined or predetermined cool down threshold value and use a timer/clock to lock out of prevent an additional pierce until the threshold value has expired. For example, the controller may have a threshold value of 30 seconds after a cutting operation, such that if a subsequent pierce is attempted before the 30 seconds expires the pierce will be prevented. The threshold value can be predetermined within the controller, or can be determined by the controller based on input information, such as the torch connected and/or the cutting current used for the prior cutting operation. For example, if the prior cutting operation had a first current level (e.g., 80 amps) the threshold will have a first value (30 seconds), and if the prior cutting current had a second steady state value (e.g., 100 amps) the threshold will have a second value (e.g., 45 seconds). Thus, the controller can use a counter/timer which begins when the prior cutting operation ends and counts to the expiration of the threshold value, after which a subsequent piercing operation can be started. In some exemplary embodiments, the display on the power supply can display a countdown of the threshold value to show a user the time delay until the next pierce can begin.

Figure 6:
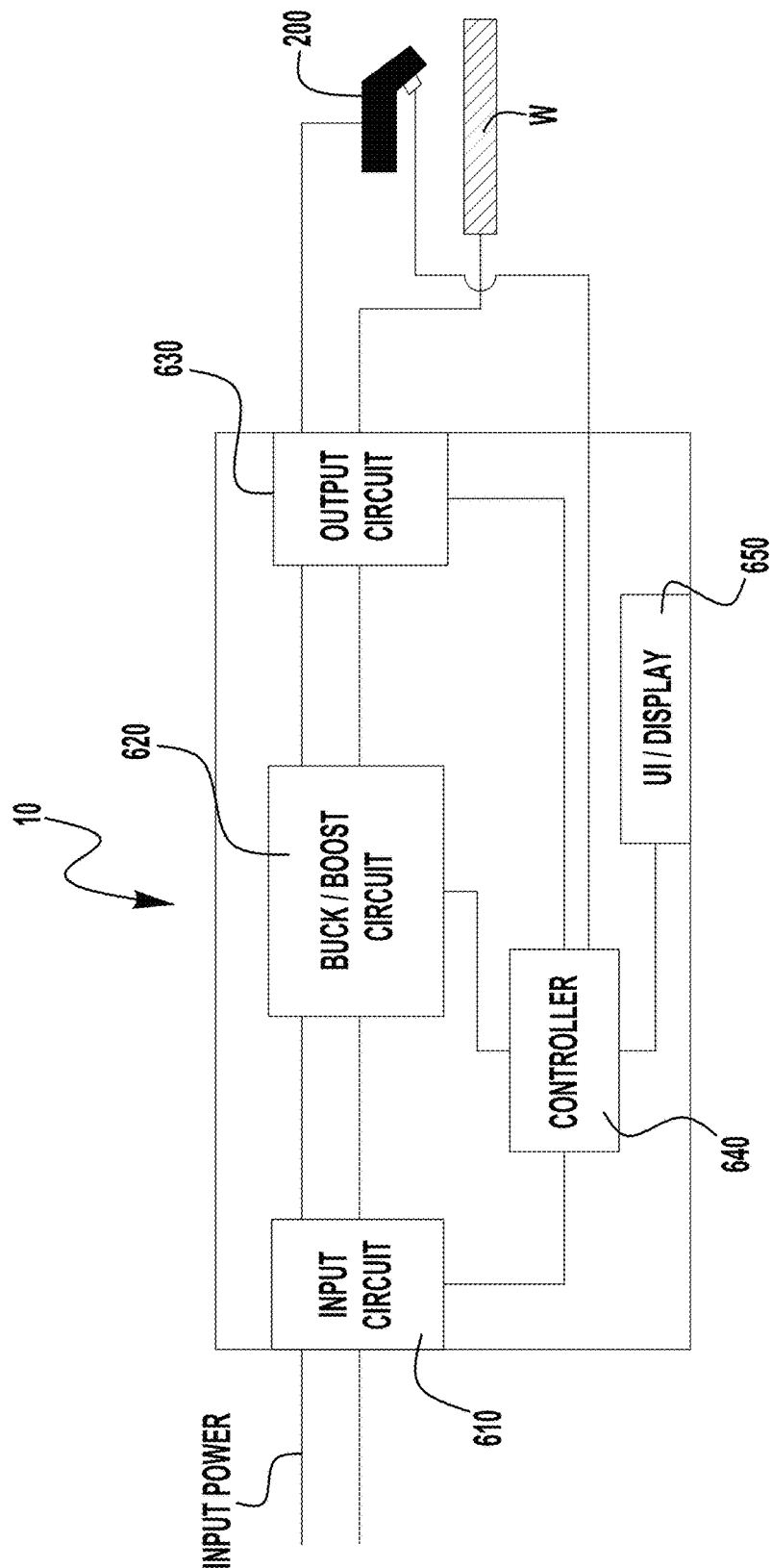
FIG. 6 is a diagrammatical representation of an exemplary plasma cutting system of the present invention which can implement exemplary piercing operations described herein.

An exemplary, non-limiting power supply 10, is shown in FIG. 6. This topology is intended to be exemplary and embodiments of the present invention are not limited thereto. As shown in this embodiment, an input power/current (which can be generator or utility power) is received by a rectifier or other input circuit 610. The power/current is then rectified and provided to a buck/boost circuit 620, which may or may not be power factor corrected. The circuit 620 then outputs a DC power signal over a DC bus to an output circuit 630, which can be a chopper, PWM, etc., which provide the desired output current to the torch 200 to cut the workpiece W. The power supply 10 includes a controller 640 which can receive control power from the input circuit and control/monitor the operation of the buck/boost circuit 620 and/or the output circuit 630 to provide the desired cutting current, whether pierce or cutting, etc. The controller 640 is also coupled to a user interface/display 650. The user interface/display can allow for a user to input data as described herein, and display information as described herein. The controller 640 can be any known CPU based computer system having processing and memory to perform the functions as described herein. For example the controller 640 can use look up table and the like to perform the functions and make the determinations described herein. Other embodiments are not limited to the configuration shown in FIG. 6.

While the subject matter of the present application has been described with reference to certain embodiments, it will be understood by those skilled in the art that various changes may be made and equivalents may be substituted without departing from the scope of the subject matter. In addition, many modifications may be made to adapt a particular situation or material to the teachings of the subject matter without departing from its scope. Therefore, it is intended that the subject matter not be limited to the particular embodiment disclosed, but that the subject matter will include all embodiments falling within the scope described herein.

We claim:

1. A plasma cutting system, comprising:
   a power supply which receives an input power and outputs a pierce current during a pierce operation and a cutting current during a cutting operation of a workpiece; and
   a controller which controls an operation of said power supply to output said pierce current and said cutting current, where said cutting current has a maximum current level which is based on a maximum cutting current level for a cutting torch for said cutting operation;
   wherein said pierce current for said pierce operation is higher than said maximum cutting current level for the cutting torch, and said controller determines a pierce duration for said pierce current and said pierce duration is sufficient for piercing the workpiece with the pierce current, and
   wherein the pierce current is output by the power supply for the pierce duration or until a detection of a pierce by said controller through said workpiece, and the cutting current is output by the power supply after the pierce current is output.

2. The system of claim 1, wherein said pierce current is in the range of 20 to 60% higher than said maximum cutting current level for the cutting torch.

3. The system of claim 1, wherein said pierce current is in the range of 25 to 50% higher than said maximum cutting current level for the cutting torch.

4. The system of claim 1, wherein said pierce duration is determined by said controller based on a user input of the maximum cutting current level for the cutting torch, and said pierce duration is sufficient for piercing the workpiece with the pierce current without exceeding a thermal capacity of a nozzle of the cutting torch.

5. The system of claim 1, wherein said pierce duration is predetermined.

6. The system of claim 1, wherein said pierce duration is predetermined based on said maximum cutting current level for said cutting torch.

7. The system of claim 1, wherein said pierce duration is in the range of 1 to 5 seconds.

8. The system of claim 1, wherein the pierce operation is a first pierce operation, and wherein said controller has a cool down threshold time and prevents a second pierce operation after said cutting operation until said cool down threshold time is reached.

9. The system of claim 1, further comprising:
   a user interface coupled to said controller and configured to receive a user input of the maximum cutting current level for the cutting torch and a thickness of the workpiece; and
   a user display coupled to said controller which displays to a user an indication of whether or not the pierce operation and the cutting operation are permitted, based on the maximum cutting current level for the cutting torch and the thickness of the workpiece.

10. The system of claim 1, further comprising a user display coupled to said controller which displays a positive indication for said pierce operation based on user input to said controller.

11. A plasma cutting system, comprising:
    a power supply which receives an input power and outputs a pierce current during a pierce operation and a cutting current during a cutting operation of a workpiece; and
    a controller which controls an operation of the power supply to output the pierce current and the cutting current, where the cutting current has a maximum current level which is based on a maximum cutting current level for a cutting torch for the cutting operation;
    wherein the pierce current for the pierce operation is higher than the maximum cutting current level for the cutting torch, and the controller determines, for the pierce current, a maximum pierce duration that is sufficient for piercing the workpiece with the pierce current, and
    wherein the pierce current is output by the power supply until a detection by the controller of a pierce through the workpiece, and the cutting current is output by the power supply after the detection of the pierce through workpiece.

12. The system of claim 11, wherein the pierce current is in the range of 25 to 50% higher than the maximum cutting current level for the cutting torch.

13. The system of claim 11, wherein the maximum pierce duration is determined by the controller based on a user input of the maximum cutting current level for the cutting torch, and the maximum pierce duration is sufficient for piercing the workpiece with the pierce current without exceeding a thermal capacity of a nozzle of the cutting torch.

14. The system of claim 11, wherein the pierce operation is a first pierce operation, and wherein the controller has a cool down threshold time and prevents a second pierce operation after the cutting operation until the cool down threshold time is reached.

15. The system of claim 11, further comprising:
a user interface coupled to the controller and configured to receive a user input of the maximum cutting current level for the cutting torch and a thickness of the workpiece; and
a user display coupled to the controller which displays to a user an indication of whether or not the pierce operation and the cutting operation are permitted, based on the maximum cutting current level for the cutting torch and the thickness of the workpiece.

16. A plasma cutting system, comprising:
a power supply which receives an input power and outputs a pierce current during a pierce operation and a cutting current during a cutting operation of a workpiece; and
a controller which controls an operation of the power supply to output the pierce current and the cutting current, where the cutting current has a maximum current level which is based on a maximum cutting current level for a cutting torch for the cutting operation;
wherein the pierce current for the pierce operation is higher than the maximum cutting current level for the cutting torch, and the controller determines, for the pierce current, a maximum pierce duration that is sufficient for piercing the workpiece with the pierce current, and
wherein the pierce current is output by the power supply for a duration not exceeding the maximum pierce duration, and the cutting current is output by the power supply after the pierce current is output.

17. The system of claim 16, wherein the pierce current is in the range of 25 to 50% higher than the maximum cutting current level for the cutting torch.

18. The system of claim 16, wherein the maximum pierce duration is determined by the controller based on a user input of the maximum cutting current level for the cutting torch, and the maximum pierce duration is sufficient for piercing the workpiece with the pierce current without exceeding a thermal capacity of a nozzle of the cutting torch.

19. The system of claim 16, wherein the pierce operation is a first pierce operation, and wherein the controller has a cool down threshold time and prevents a second pierce operation after the cutting operation until the cool down threshold time is reached.

20. The system of claim 16, further comprising:
a user interface coupled to the controller and configured to receive a user input of the maximum cutting current level for the cutting torch and a thickness of the workpiece; and
a user display coupled to the controller which displays to a user an indication of whether or not the pierce operation and the cutting operation are permitted, based on the maximum cutting current level for the cutting torch and the thickness of the workpiece.

* * * * *